United States Patent [19]

Nagel et al.

[11] Patent Number: 5,076,235

[45] Date of Patent: Dec. 31, 1991

[54] KNOCK CONTROL IN INTERNAL COMBUSTION ENGINES

[75] Inventors: Rudolf Nagel, Gifhorn; Wolfgang Richter, Ludwigsburg, both of Fed. Rep. of Germany

[73] Assignee: Robert Bosch GmbH, Stuttgart, Fed. Rep. of Germany

[21] Appl. No.: 613,510

[22] PCT Filed: Jun. 13, 1988

[86] PCT No.: PCT/EP88/00523

§ 371 Date: Oct. 31, 1990

§ 102(e) Date: Oct. 31, 1990

[87] PCT Pub. No.: WO89/12746

PCT Pub. Date: Dec. 28, 1989

[51] Int. Cl.[5] .............................................. F02P 5/15
[52] U.S. Cl. ................................. 123/425; 364/431.08
[58] Field of Search ............................... 123/425, 435; 364/431.08

[56] References Cited

U.S. PATENT DOCUMENTS 4,819,603  4/1989  Morita et al. ..................... 123/425

FOREIGN PATENT DOCUMENTS 59-224468  12/1984  Japan .................................. 123/425
59-224469  12/1984  Japan .................................. 123/425

Primary Examiner—Andrew M. Dolinar
Attorney, Agent, or Firm—Michael J. Striker

[57] ABSTRACT

A method of controlling the operation of an internal combustion engine (1) provided with a memory (3, 4) storing values of a particular operating parameter ($\alpha_z$) for use at various operating conditions (n, $P_s$) comprises operating the engine using those stored values, detecting knocking using a knock detector adjusting the operating parameter in response to signals from the knock detector (11), calculating the length of time $t_s$ for which each set of operating conditions is maintained, and altering the stored parameter values by an amount which depends on the calculated length of time ($t_s$).

12 Claims, 1 Drawing Sheet

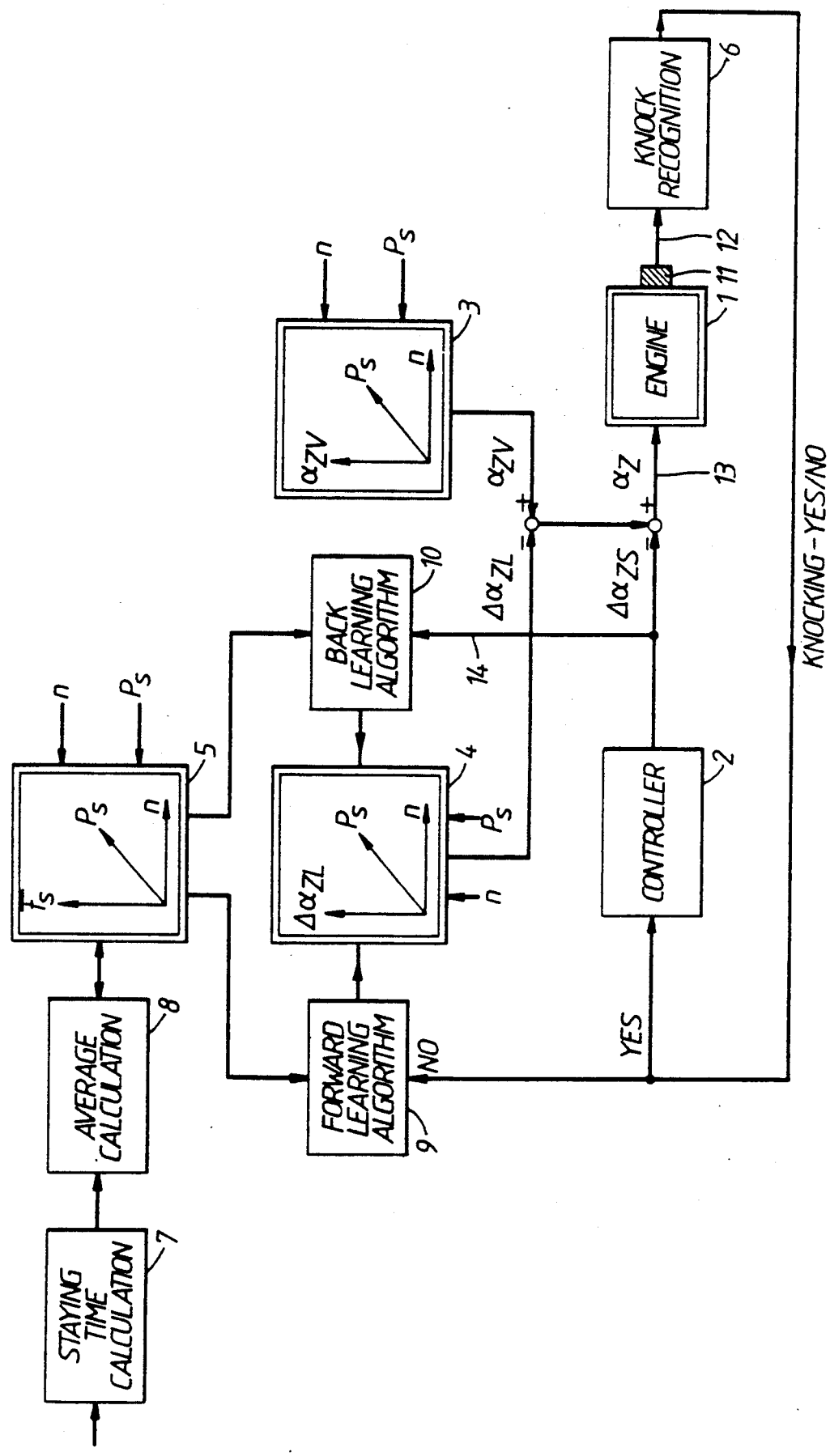

KNOCK CONTROL IN INTERNAL COMBUSTION ENGINES

BACKGROUND OF THE INVENTION

The present invention relates to a knock control system and method for internal combustion engines. The invention is particularly applicable to spark ignition engines having electronic ignition.

It is now well known in computer or microprocessor controlled electronic ignition systems to store characteristic data for use in controlling operation of the engine. This may include an ignition base map which optimises the value of an ignition angle and dwell period for various operating conditions of the engine. The map stores optimised values for possible combinations of engine speed and engine load which can be modified to compensate for variations in engine temperature for example. The characteristic data is usually derived empirically, supplied by the manufacturer of the engine, and is obtained by running the engine under experimental conditions on a test stand.

In use, and as the engine wears, components age or are changed, valves and their adjustment change, the fuel quality changes and differs from that under which the tests were made and, as a result of these changes, the stored characteristics may no longer fit the engine and are less than ideally suited for its control.

Air pressure, ambient humidity and the like can also change the operation of an engine and affect the suitability of the stored characteristics.

Therefore, the stored characteristics alone are not sufficient to control the operation of the engine. In particular, if the ignition angle is not optimised for existing operating conditions, combustion knocking can occur. Combustion knocking can damage an internal combustion engine and should be eliminated if possible. Therefore, electronic ignition systems generally include a knock control system. Knocking can be eliminated by retarding the ignition angle but this can have an adverse effect on exhaust emissions and possibly fuel consumption. The ignition should ideally be retarded by the minimum amount sufficient to ensure that knocking does not occur, i.e. the engine should operate close to the knock limit. In practice knocking is detected by a sensor which detects engine vibrations and the knock intensity is determined from the sensor signals. In fact knocking is not eliminated entirely but rather an acceptable intensity band is defined within which the engine should be operated.

Thus, in an electronic ignition system with knock control, when the engine is at a particular operating point the electronic control unit (ECU) signals the ignition to be retarded in response to detection of knocking of unacceptable intensity. If, after retardation, unacceptable knocking is still detected the ignition will be retarded further and so on until the knocking is within the acceptable intensity band. When the operation of the engine is moved to another operating point, a new value for the ignition angle will be taken from the ignition map and this new value will be modified by the knock control system if necessary. If the detected knock intensity is below the acceptable intensity band the ignition timing may be brought forward by the knock control system until the knock intensity is within that band. This is known as closed-loop knock control.

A disadvantage with ordinary closed-loop knock control is that when the engine returns to an operating point at which knocking was previously occurring the knock control system has to repeat the process of modifying the ignition angle. Therefore, more recent knock control systems have a "learning" function. With "learning" knock control, as well as the base ignition map, a second "learning" map is stored which contains data for modifying the data in the base ignition map. The data in the learning map is accumulated during running of the engine. Thus, for example, if knocking is detected at a particular operating point, so that the ignition angle from the base map is modified by the closed loop knock control system, a difference value for the ignition angle is stored in the learning map so that when the engine returns to the same operating point the modified value for the ignition angle is used automatically, as derived from the base map together with the learning map, and it is not normally necessary for the closed loop knock control system to further modify the ignition angle. Other factors may effect engine knocking such as fuel quality and atmospheric pressure as mentioned above. If there is a large change in, say, atmospheric pressure before the engine returns to a particular operating point, the closed loop knock control may operate to alter the ignition angle derived from the base map and the learning map and the learning map will be updated.

A knock control system having a learning function is disclosed in U.S. Pat. No. 4,700,677. Such a system is generally called an adaptive system because the stored functional relationships which control ignition timing are adapted for the current operating conditions.

In known knock control systems having a learning function as described above, the learning map is updated after a predetermined time which may be defined as a particular number of combustion cycles. This predetermined time must be sufficiently large to establish normal running conditions, i.e. free from transients. On the other hand it must not be too large since otherwise the overall response of the engine to changes in conditions will be too slow. The time, which will hereinafter be referred to as the "observation time", is a fixed parameter of the learning algorithm. As a result, the learning algorithm is not able to adapt itself to various operating conditions of the engine resulting from changes in the manner in which the car is being driven. For example, one driver may drive the car very differently from another but known systems cannot be adapted to account for this. Also, the same driver may drive very differently on a motorway from the way he drives through a town. If a driver is particularly erratic, the engine may not remain at operating conditions sufficiently long for the learning map to be updated. The efficiency of the learning process is dependant on the driver, which is clearly undesirable.

SUMMARY OF THE INVENTION

It is an object of the present invention to provide a knock control system and method which automatically adjusts its learning algorithm to the mode of driving.

In particular, the present invention provides a method of controlling the operation of an internal combustion engine using:

memory means storing suitable values of an operating parameter for use at various sets of operating conditions of the engine;

a knock detector; and means for adjusting said operating parameter in response to signals from the knock detector;

the method comprising the steps of:

operating the engine using the stored values of said operating parameter from the memory means at each set of operating conditions of the engine, detecting knocking using said knock detector, and adjusting the operating parameter in response to signals from the knock detector and;

calculating the length of time for which each set of operating conditions is maintained and altering the stored parameter values in said memory means by an amount which depends on said calculated length of time.

Let us suppose for example that the adjusting means, which will usually be in the form of a controller, indicates that the ignition angle should be changed by an amount $\theta°$. If the operating conditions have been maintained for a sufficiently long time it can be assumed that this indication is good and the value in the memory for these particular operating conditions can be changed by the amount $\theta°$. However, if the operating conditions have only been maintained for a short time it may be that this indication has resulted from transient knocking, for example. If the value was changed by the amount $\theta°$ and the indication did result from transient knocking, the overall result of such a system would be large fluctuations in the stored values in the memory which would adversely affect the running of the engine. According to the invention the memory value is updated by a fraction of $\theta°$ which depends on the actual time for which the conditions were maintained. The method ensures that the memory is updated even when the operating conditions are changed very quickly by changing the stored values by smaller increments for shorter calculated times. At the same time large fluctuations resulting from transient conditions are avoided.

The present invention both as to its construction so to its method of operation, together with additional objects and advantages thereof, will be best understood from the following detailed description of the preferred embodiment when read with reference to the accompanying drawings.

BRIEF DESCRIPTION OF THE DRAWINGS

The only FIGURE of the drawings shows a schematic diagram of an internal combustion engine control system used with a method according to the invention.

DETAILED DESCRIPTION OF THE PREFERRED EMBODIMENT

Numeral 1 in the diagram indicates an engine, which in this example is an Otto-type internal combustion engine of an automotive vehicle. The system for controlling the engine includes controller 2 and memories 3, 4 and 5. Various functions which are carried out by the system and which will be described in more detail below are indicated by numerals 6 to 10. In practice the system will be implemented using an onboard computer or microprocessor in the vehicle.

Memory 3 is preferably a read-only memory (ROM) which stores basic functional characteristics of the engine. Such data may be supplied by the engine manufacturer. Among other things, the memory 3 stores the base map referred to above giving optimum ignition angle values for particular operating conditions in terms of engine speed (n) and engine load. The engine will be provided with transducers, not shown, for measuring the rotational speed of the engine and the load. The amount of the load may be ascertained from the inlet manifold pressure ($P_s$). The transducers will supply signals to the computer which will look up the appropriate value of ignition angle $a_{zv}$. This value along with modifying data to be described below will be used to control the operation of the engine until the values of engine speed and load are changed and a new value for $a_{zv}$ is supplied.

The engine is provided with a knock sensor 11 which provides signals over a knock sensing line 12. The knock sensor may be responsive to vibrations of the engine which occur under knocking conditions. Circuitry is provided for analysing signals from the knock sensor 11, indicated generally at 6. Recognition of knocking is well known in the art and will not be discussed further herein.

If a knocking condition is detected the controller delivers output signals via line 13 to the engine to cause the ignition to be retarded by a certain increment, e.g. 1° angle of rotation. This value is indicated as $\Delta a$ zs. If knocking is still detected the controller will cause the engine to be retarded further and further (i.e. $\Delta a$ zs is increased ) until the knocking condition is no longer present. When the operating condition is changed the computer will supply a new value for the ignition angle and the process is repeated The actual ignition angle is indicated as $X_z$ in the diagram.

If it is detected that the engine is operating under non-knocking conditions and should be brought closer to the knock limit, i.e. the knock intensity is below the acceptable band mentioned above, the ignition is brought forward by increments until the engine is operating at the knock limit. The way in which this is carried out will be described in more detail below.

Numeral 4 in the diagram indicates a second memory which is preferably a random access memory (RAM) and which stores, usually along with other data, the learning map referred to above. The learning map contains data for modifying information in the base map of memory 3 to compensate, for example, for changes in fuel quality, changes in ambient humidity and atmospheric pressure and changes in the components of the engine affecting its operation. For every value of ignition angle $a$ zv contained in the base map in memory 3 there may be a value $\Delta a$ ZL zn in memory 4 representing a change in ignition angle. During operation of the engine both memories 3 and 4 are addressed and the actual value of ignition angle used for operating the engine is $a_{zv} - \Delta a ZL$.

Signals representing changes in ignition angle $\Delta a_{ZS}$, supplied by the controller 2 are supplied to the RAM 4 along data line 14. The signals from the controller which represent values of $\Delta a_{ZS}$ are used to update the information in the learning map. The manner in which data in the learning map is accumulated and updated is controlled by the algorithms indicated at 9 and 10. The algorithms utilise information from a second random access memory 5 which will be described in more detail below.

While the engine is being driven its operating conditions will vary and different values from the base map in memory 3 will be used to control the ignition angle. Thus, for example, when the engine speed in between X and $X + \Delta X$ revolutions per minute and the inlet-manifold pressure is between y and $y + \Delta y$ N/m², the ignition angle $Z_1$ will be looked up from memory 3 and when the engine speed or load moves out of this range a new ignition angle $Z_2$ will be looked up from memory 3. The knock control system of the present invention calculates how long each set of operating conditions is maintained before the conditions move to a new point on the base map in memory 3 and a new ignition angle is looked up. This is indicated by numeral 7 in the diagram. Thus, for each combination of engine speed and load through which the engine is driven, a time period will be calculated which is hereinafter referred to as the "staying time". The staying times are stored in a memory 5 which is preferably another random access memory. Thus, memory 5 contains another map which stores a staying time $t_s$ for combinations of speed and load corresponding to the speed and load points on the maps in the memories 3 and 4. The "staying times" may be calculated as actual times but they are preferably calculated as numbers of combustion cycles, for reasons which will be explained below.

Each staying time which is calculated is preferably averaged with any staying time for the same operating point already stored in memory 5. This is indicated at 8 in the diagram. The new average staying time is written over the existing average staying time in memory 5.

The manner in which the memory 4 is updated for retarding the ignition is controlled by the algorithm indicated at 10 in the drawings. Suppose that the engine operates at between X and $X+\Delta X$ revs engine speed with a pressure between y and $y+\Delta y$ N/m² for a staying time of $T_1$. During this time knocking occurs and the controller retards the ignition by several increments until no knocking occurs with a change in ignition angle of Assuming no transient knocking was occurring, the value $\Delta\alpha_1$ would be written into the learning map for retarding the ignition angle when the engine returned to the same operating conditions. However, as mentioned above transient conditions have to be taken into account. In the present method, the signals representing values $\Delta\alpha_{ZS}$ supplied from controller 2 are averaged over the time $T_1$ before being supplied to the learning map. The average staying time $\bar{t}_s$ for the compared with a preset observation time $T_o$. If $t_s$ is greater than or equal to $T_o$ the average value of $\Delta\alpha_{ZS}$ supplied by controller 2 during the time $T_1$ is added to the value $\Delta\alpha_{ZL}$ in the learning map of memory 4 to provide a new value of $\Delta\alpha_{ZL}$. If however $t_s$ is less than $T_o$ because the operating conditions have only been maintained for a short time, the value of $\Delta\alpha_{ZL}$ is only changed by a fraction of the calculated average value of $\Delta\alpha_{ZS}$. This fraction is preferably equal to $(t_s-T_o)$.

Thus, if the manner of driving is such that the operating conditions are changed slowly the values of $t_s$ will be large and the learning map will be changed by the full calculated average values of ignition angle from the controller However, if the operating conditions are only maintained for short periods of time the learning map is altered but by a smaller amount which is dependent on the actual staying times.

If the values in the learning map were incremented by the full calculated average values of for very small staying times, and if transient knocking occurred during those staying times this would result in large fluctuations in the values stored in the learning map and unsatisfactory operation of the engine. The method described above ensures that the learning map is updated even if the manner of driving is such that the staying times are smaller, whilst avoiding such large fluctuations.

It is preferred to average the values of supplied from the controller and to update memory 4 on the basis of average values because the output from the controller is not steady and they may have a sawtooth shape even in the steady state after knocking has been eliminated. The averaging of the staying times may be necessary in order to avoid too wide a dynamic range in the learning algorithm (for example unnecessary frequent reorientation in the learning process)

The manner in which the memory 4 is updated for bringing the ignition forward is controlled by a forward learning algorithm indicated at 9. The forward learning algorithm analyses signals from the knock recognition circuit 6 indicating that no knocking is occurring. When such conditions exist it is generally desirable to bring the ignition forward so that it is close to the knock limit so as to optimise emissions and fuel consumption whilst ensuring that knocking does not occur. Thus, when "no-knocking" signals are received from the knock recognition circuit for a particular set of operating conditions, the stored value of ignition angle should be altered so that the ignition timing is brought forward. In the preferred embodiment of the present invention the values of in the memory 4 are automatically incremented when no knocking occurs. Again the amount by which $\Delta\alpha_{ZL}$ is changed depends on the average waiting time for the particular operating conditions stored in the memory 5. The controller 2 does not participate in the advancement of the ignition. Also, there is no fixed waiting time. The amount by which $\Delta\alpha_{ZL}$ is changed simply depends on the value of $t_s$ stored in memory 5.

Alternatively the algorithm 9 can correspond to the algorithm 10. In this case signals from the controller would be analysed to provide an average value of $\Delta\alpha_{ZL}$ from the controller (in this case this would be a positive angle whereas for algorithm 10 it would be a negative angle). The amount of change of the value in memory 4 could depend on $\bar{t}_s$ from the memory 5 as well as the average $\Delta\alpha_{ZS}$ from controller 2 exactly as before.

Preferably the adaptive data stored in memory 4 is stored in an electronically erasable programmable read-only memory (EE PROM) or a non-volatile random access memory (NVRAM) so that the data will be stored if the engine is switched off. When the ignition is switched on at some time later the new values of ignition angle from memories 3 and 4 will be used to operate the engine but they will be modified to take account of changed conditions of the engine such as engine temperature.

Memory 5 is preferably erased when the engine is switched off so that a new set of data is accumulated in it, for example when a new driver takes over.

In a practical system a separate controller 2 will be provided for each cylinder of the engine being controlled since each cylinder will have its own individual characteristics. Also, the memories 3 and 4 will store operating data for each individual cylinder i.e. for a four cylinder engine four maps, similar to that shown, will be stored in memory 3.

As mentioned above the "staying times" may be calculated as actual times or they may be calculated as numbers of combustion cycles. The latter is preferred because the system is then adaptive for engine speed. In this case the observation time $T_o$ will be defined as a predetermined number of combustion cycles.

An additional advantage of the present invention is that it is less dependant on fixed parameters for the operation of the learning algorithm. For example, in the known knock control systems with a learning function the "observation time" would have to be determined for each particular engine. In the present invention, the observation time $T_o$ is less critical to the operation of the method and does not have to be precisely calculated.

While the invention has been illustrated and described as embodied in a knock control in internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of controlling the operation of an internal combustion engine of a motor vehicle having a control system including memory means for storing suitable values of an operating parameter ($\alpha_z$) for use at various sets of operating conditions (n, $P_s$) of the engine, a knock detector and, means for adjusting said operating parameter ($\alpha_z$) in response to signals from the knock detector, the method comprising the steps of:
   operating the engine using the stored values of said operating parameter from the memory means at each set of operating conditions of the engine;
   detecting knocking using the knock detector;
   adjusting the operating parameter ($\alpha_z$) in response to signals from the knock detector;
   calculating the length of time ($t_s$) for which each set of operating conditions is maintained;
   averaging the amount of adjustment of the operating parameter ($\Delta\alpha_{ZS}$) over said calculating time period ($t_s$); and
   altering the stored parameter values in said memory means by an amount corresponding to one of an average amount of adjustment ($\Delta\alpha_{ZS}$) and a fraction of said average amount depending on the value of length of time ($t_s$).

2. A method as claimed in claim 1, wherein said operating parameter is an ignition angle ($\alpha_z$).

3. A method as claimed in claim 1, wherein operating conditions are defined as particular combinations of engine speed (n) and engine load ($P_s$).

4. A method as claimed in claim 1, wherein the memory means includes a first memory for storing basic functional data relating to the engine including values of said operating parameter for use at various operating conditions, and a second memory for storing data for modifying the data in the first memory, said altering step including altering only the stored parameter values in said second memory (4).

5. A method as claimed in claim 4, wherein the second memory is one of electronically erasable programmable read-only memory and a non-volatile random access memory, which retains its current data when the engine is switched off.

6. A method as claimed in claim 1 wherein said calculating step includes averaging the calculated lengths of time ($t_s$) for each operating condition during operation of the engine, the stored parameter values being altered in dependence on an average calculated length of time ($\bar{t}_s$).

7. A method as claimed in claim 6 comprising the step of storing the calculated average values in a further memory and updating them each time the engine returns to respective operating conditions.

8. A method as claimed in claim 1, comprising the step of comparing one of the calculated length of time ($t_s$) and an average calculated length of time ($\bar{t}_s$) for each set of operating conditions to a predetermined time period ($T_o$), and, if the one of calculated length of time and the average calculated length of time exceeds $T_o$, the stored parameter in said memory means is adjusted by an average amount of adjustment ($\Delta\alpha_{ZS}$) over the length of time ($t_s$).

9. A method as claimed in claim 1, comprising the step of comparing one of the calculated length of time ($t_s$) and an average calculated length of time ($\bar{t}_s$) for each set of operating conditions to a predetermined time period ($T_o$), and, if the one of the calculated length of time ($t_s$) and an average calculated length of time ($\bar{t}_s$) is less than $T_o$, the stored parameter being adjusted by an amount equal to one of $$\frac{t_s}{T_o} \times \text{ and } \frac{(\bar{t}_s)}{T_o} \times \Delta\alpha\ ZS$$

10. A method as claimed in claim 1, wherein said detecting step includes detecting signals from the knock detector which are signals indicating that knocking is occurring.

11. A method as claimed in claim 10, wherein said detecting step includes using the knock detector for providing signals indicative of an intensity of knocking, the operating parameter for each set of operating conditions being adjusted when the knocking intensity is below a predetermined value.

12. A method as claimed in claim 11, wherein said altering step includes altering the operating parameter when the knocking intensity is below the predetermined value by an amount depending on said calculated length of time ($t_s$).

* * * * *